United States Patent [19]
Bivens

[11] Patent Number: 5,258,894
[45] Date of Patent: Nov. 2, 1993

[54] SNAP-IN HEADLAMP ADJUSTMENT ASSEMBLY

[75] Inventor: Steven L. Bivens, Kankakee, Ill.

[73] Assignee: Illinois Tool Works Inc., Glenview, Ill.

[21] Appl. No.: 989,534

[22] Filed: Dec. 11, 1992

[51] Int. Cl.5 ............................................... F21V 3/18
[52] U.S. Cl. .................................... 362/66; 362/273; 362/289
[58] Field of Search ............... 362/61, 66, 80, 273, 362/289, 70, 428, 69, 425, 324, 421

[56] References Cited

U.S. PATENT DOCUMENTS

| | | | |
|---|---|---|---|
| 4,188,655 | 2/1980 | Tallow et al. | 362/80 |
| 4,271,456 | 6/1981 | Dick | 362/66 |
| 4,599,681 | 7/1986 | McMahan et al. | 362/80 |
| 5,047,904 | 9/1991 | Vraux | 362/66 |
| 5,063,481 | 11/1991 | Martin | 362/61 |

Primary Examiner—James C. Yeung
Attorney, Agent, or Firm—Thomas W. Buckman; John P. O'Brien

[57] ABSTRACT

A snap-in headlamp adjustment assembly for positioning a vehicle headlamp mounted upon a movable mounting bracket relative to a fixed vehicle frame includes a snap-in adjuster nut being formed of a head portion, a body portion, and a flange portion. The head portion includes a plurality of resilient arms which are interlockingly engagable with an interior retaining surface of the fixed vehicle frame to secure the adjuster nut against axial movement relative to an opening in the vehicle frame. A pair of projections are formed on the flange portion and are engagable with corresponding grooves disposed adjacent the opening on an exterior surface of the vehicle frame to secure the adjuster nut against rotation relative to the opening on the vehicle frame.

13 Claims, 1 Drawing Sheet

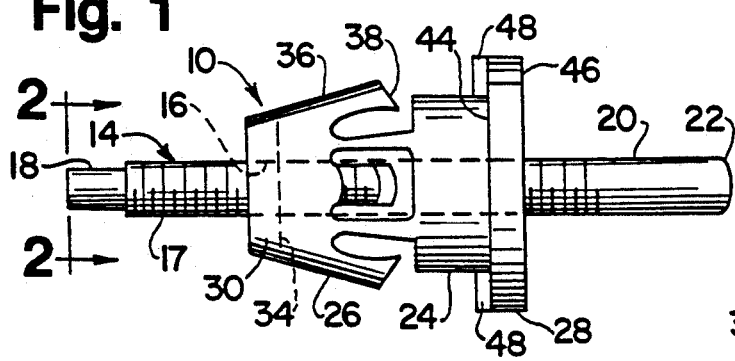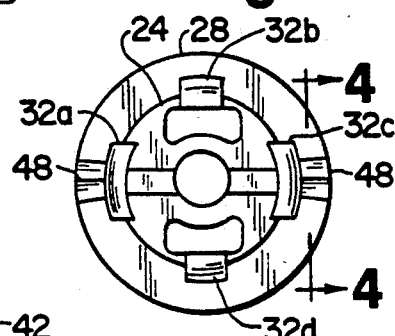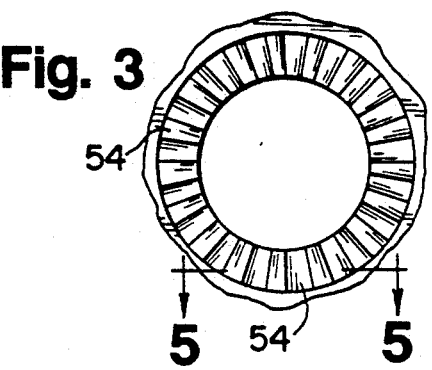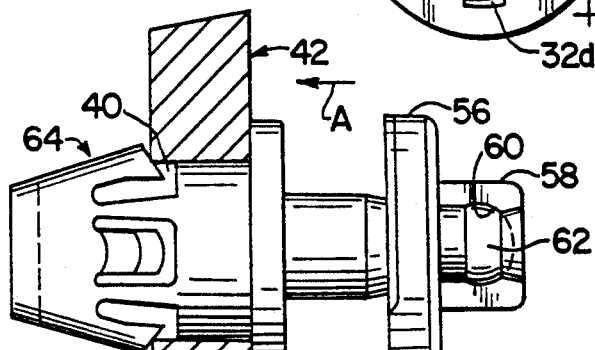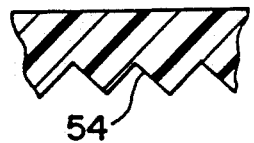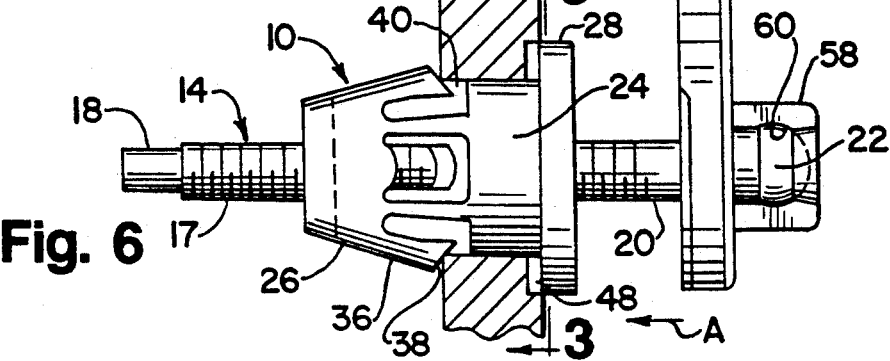

SNAP-IN HEADLAMP ADJUSTMENT ASSEMBLY

BACKGROUND OF THE INVENTION

1. Field of the Invention:

This invention relates generally to vehicle headlamp assemblies and more particularly, it relates to an improved snap-in headlamp adjustment assembly for positioning a vehicle headlamp which includes a snap-in adjuster nut secured to a vehicle frame so as to prevent both axial and rotational movement.

2. Description of the Prior Art:

As is well-known in the automotive industry, vehicle headlamp mounting and adjustment assemblies have been used for the past many years. Typically, the headlamp is mounted on a movable support housing and one or more threaded screw adjusters are used at different locations for moving the movable housing relative to a fixed vehicle frame a predetermined amount so as to position the headlamp as desired. In general, there would be at least two such threaded screw adjusters provided so as to position the headlamp in both the horizontal and vertical planes.

The prior art appears to be best exemplified in the following patents which were developed in a search directed to the subject matter of this application: U.S. Pat. Nos. 4,188,655; 4,599,681; and 5,063,481.

In U.S. Pat. No. 4,188,655 to Thomas G. Tallon et al. issued on Feb. 12, 1980, there is disclosed a vehicle headlamp and mounting assembly which includes a flanged fastening nut 46 (47) formed of a generally rectangular cross-section and a blunt tapered rearward portion by which it is inserted through an opening 61 formed in a mounting panel 60. The fastening nut 46 has a pair of inwardly yieldable shoulders 48, 49 formed on its opposite sides and includes a pair of outwardly extending yieldable flanges or ears 51, 52 that bear against the front face of the mounting panel in which the nut is securely retained. The nut is molded of a plastic material and receives threadably therein an adjusting screw 42 (43).

In U.S. Pat. No. 4,599,681 to David R. McMahan et al. issued on Jul. 8, 1986, there is disclosed a vehicle headlamp assembly which includes a support housing 12, a headlamp support bracket 14 and a pair of rectangular vehicle headlamp units 16 and 18 mounted within the support bracket. The support housing 12 has a top wall 26 formed with a pair of upstanding ears 36 and 38. Each ear has a rectangular opening therein for rigidly retaining a snap-in type self-retaining plastic nut 40. The headlamp assembly includes three adjustment screws 20, 22 and 24 of which two are threadably received by the nuts 40 mounted in the ears 36, 38 which serve to adjustably position the support bracket and the headlamp units about a horizontal axis and a pair of inclined axes.

U.S. Pat. No. 5,063,481 to John P. Martin issued on Nov. 5, 1991, teaches a pivot assembly which is used to provide a pivot point for positioning a vehicular headlight mounted on a movable frame relative to a fixed frame. The pivot assembly includes a ball stud 50 that is secured to a selected one of the fixed and movable frames by a retainer clip 60. The clip is formed with an edge 28 which engages a transverse annular groove 10 in the ball stud so as to prevent axial movement and has at least one resilient arm 24 having a free-end 26 for engagement with one of a plurality of circumferentially spaced grooves 14. The plurality of grooves are in substantial transverse relationship to the annular groove 10 and cooperates with the free-end 26 of the arm 24 so as to prevent rotation of the ball stud 50 relative to an opening 41 formed in the fixed frame 36.

The present invention represents a significant improvement over the pivot assembly shown and described in the aforementioned '481 patent. In the assembly process of the pivot assembly of the '481 patent, the assembler is required to insert initially the elongated portion 8 of the ball stud 50 through the opening 41 in the fixed vehicle frame 36. Then, the assembler must reach behind the fixed frame 36 so as to install the metal retainer clip 60 into the annular groove 10 while holding constant pressure on the vehicle headlamp. As a result, there is encountered during manufacturing the disadvantage of increased assembly costs as well as component costs. Further, since the assembler has to get behind the vehicle frame in order to install the clip there must be provided a certain amount of clearance behind the vehicular frame which tends to restrict its design. Moreover, if the annular groove 10 on the ball stud is too large the clip will permit rattling of the ball stud or if the groove 10 is too small the clip will be difficult to install.

Accordingly, it would be desirable to provide a snap-in headlamp adjustment assembly for positioning a vehicle headlamp which can be quickly and easily installed by an ordinary user. It would also be expedient that the adjustment assembly prevent both axial and rotational movement relative to an opening formed in the fixed vehicle frame.

SUMMARY OF THE INVENTION

Accordingly, it is a general object of the present invention to provide an improved snap-in headlamp adjustment assembly for positioning a vehicle headlamp which is relatively simple and economical to manufacture and assemble, but yet overcomes the disadvantages of the prior art vehicle headlamp assemblies.

It is an object of the present invention to provide an improved snap-in headlamp adjustment assembly for positioning a vehicle headlamp which includes a snap-in adjuster nut secured to a vehicle frame so as to prevent both axial and rotational movement.

It is another object of the present invention to provide an improved snap-in headlamp adjustment assembly which eliminates the need of a separate metal retainer clip heretofore employed in a present form of a vehicle headlamp pivot assembly.

It is still another object of the present invention to provide an improved snap-in headlamp adjustment assembly for positioning a vehicle headlamp which can be quickly and easily installed by an ordinary user.

It is still yet another object of the present invention to provide an improved snap-in headlamp adjustment assembly for positioning a vehicle headlamp which compensates for larger variations in the thicknesses of a fixed vehicle frame.

In accordance with these aims and objectives, the present invention is concerned with the provision of an improved snap-in headlamp adjustment assembly for positioning a vehicle headlamp mounted upon a movable mounting bracket relative to a fixed vehicle frame. The adjustment assembly includes a snap-in adjuster nut which is formed of a head portion, a body portion and a flange portion. The body portion has its one end formed integrally with the head portion and its other end joined integrally to the flange portion. The head portion has a collar and a plurality of resilient arms extending longitudinally from the collar in a direction towards the body portion. Each of the plurality of resilient arms has an end surface. The flange portion has a pair of projections disposed on its inner surface adjacent the body portion. The adjuster nut has an adjustment screw which extends therethrough. One end of the adjustment screw is adapted for engagement with the movable mounting bracket.

The head portion of the adjuster nut is inserted through an opening formed in the fixed vehicle frame so that the end surfaces of the plurality of resilient arms interlockingly engage with an interior retaining surface of the fixed vehicle frame to secure the adjuster nut against axial movement relative to the opening in the vehicle frame. The pair of projections on the flange portion are engaged with corresponding grooves disposed adjacent the opening on an exterior surface of the vehicle frame to secure the adjuster nut against rotation relative to the opening in the vehicle frame.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a side elevational view of a snap-in adjuster nut that is a part of the snap-in headlamp adjustment assembly of the present invention;

FIG. 2 is a left end view of the snap-in nut of FIG. 1, taken along the lines 2—2;

FIG. 3 is a right side view of the fixed vehicle frame of FIG. 1, taken along the lines 3—3;

FIG. 4 is a cross-sectional view, taken along the lines 4—4 of FIG. 2;

FIG. 5 is a cross-sectional view, taken along the lines 5—5 of FIG. 3; and

FIG. 6 is a side elevational view of the snap-in headlamp adjustment assembly, illustrating the snap-in adjuster nut secured to the fixed vehicle frame for permitting adjustment of a movable mounting bracket about a pivot point.

DESCRIPTION OF THE PREFERRED EMBODIMENT

Referring now in detail to the drawings, there is shown in FIGS. 1-5 a snap-in adjuster nut 10 which is a part of a snap-in headlamp adjustment assembly 12 (FIG. 6), constructed in accordance with the principles of the present invention. The snap-in adjuster nut 10 has a threaded adjustment screw 14 formed integrally therewith and extending longitudinally through its axial bore 16. One end of the adjustment screw 14 is formed integrally with a rod 17 having a rotatable stem 18 therein, and the other end thereof is formed integrally with an elongated portion 20 terminating in a sphere or ball-like configuration 22. The snap-in adjuster nut 10 and the adjustment screw 14 are preferably formed of a plastic material such as nylon which can be manufactured easily and at reduced cost by a conventional insert-injection molding process.

The snap-in adjuster screw 10 is comprised of a body portion 24, a head portion 26 formed integrally with one end of the body portion, and an enlarged circular flange portion 28 joined integrally to the other end of the body portion. The head portion 26 includes a collar 30 and four equally-spaced resilient arms 32a through 32d extending longitudinally from an inner surface 34 of the collar 30. Each of the resilient arms 32 preferably has an inclined outer surface 36 which extends radially outwardly in a direction towards the body portion 24. Further, each of the resilient arms has an inwardly sloping end surface 38 so as to provide a wedging action in an opening 40 formed in the fixed vehicle frame 42.

The flange portion 28 has an inner surface 44 and an outer surface 46. The inner surface 44 is formed with at least two diametrically opposed sawtooth-like projections or peaks 48 (FIG. 4). The sawtooth-like projections 48 are substantially aligned longitudinally with the end surfaces 38 of the respective resilient arms 32a and 32c. The fixed vehicle frame 42 has an interior retaining surface 50 and an exterior surface 52 with the opening 40 extending longitudinally therethrough. The exterior surface 52 adjacent the opening 40 is formed with a plurality of circumferentially equally-spaced grooves 54, as can best be seen in FIGS. 3 and 5.

Referring now to FIG. 6, the snap-in adjustment assembly 12 further includes a movable headlamp mounting bracket 56 and a pair of socket-type inserts 58 secured adjacent the ends of the mounting bracket. Each of the inserts 58 is provided with a cavity 60. The ball-like configuration 22 of the snap-in adjuster nut 10 and a ball element 62 of a center pivot element 64 are snapped into the respective cavity 60 and are thus frictionally retained therein. The center pivot element 64 is substantially identical in its construction to the adjuster nut 10, except for the rod 17 and the rotatable stem 18. It will be noted that the ball-like configuration 22 and the ball element 62 are universally movable in or with three directions of rotational freedom. Then, a headlamp housing (not shown) containing the vehicle headlamp is mounted fixedly to the mounting bracket 56 via screws (also not shown) which are inserted through holes 66 formed in the mounting bracket for threaded engagement with the back of the headlamp housing.

In use, this headlamp sub-assembly consisting of the movable mounting bracket 56, adjuster nut 10, center pivot element 64, and headlamp housing containing the headlamp is installed to the fixed vehicle frame 42. This is achieved by pushing the head portion 26 of the adjuster nut 10 and the center pivot element 64 into the corresponding openings 40 on the vehicle frame 42 wherein the inclined outer surfaces 36 are slidably engaged with the interior surface of the openings 40. The resilient arms 32a-32d are caused to flex inwardly towards each other as the adjuster nut 10 and the central pivot element 64 are moved in the direction of arrows A (FIG. 6) for insertion into the vehicle frame 42.

Further advancement of the resilient arms will cause the inwardly sloping end surfaces 38 to move past the interior retaining surface 50 of the vehicle frame, thereby permitting these resilient arms to spring or snap back to their original position as illustrated in FIGS. 1 and 6. As a result, the sloping end surfaces 38 are brought into engagement with the respective portions of the retaining surface 50 so as to interlock the subassembly and the vehicle frame 42 together and to prevent axial movement of the adjuster nut 10 and the center pivot element 64 relative to the respective openings 40 of the vehicle frame 42.

It should be noted that due to the small angles between the outer surfaces 36 of the resilient arms 32a-32d and the longitudinal axis of the adjuster nut 10 there is created a snug fit with a high pull-out force against the retaining surface 50. Further, the inwardly sloped end surfaces 38 will serve to compensate for a larger tolerance in the thicknesses of the vehicle frame 42.

While the center pivot element 64 thus secured is free to rotate relative to the opening 40 of the vehicle frame 42, the adjuster nut 10 must be prevented from such rotation relative to its opening in the vehicle frame. In order to create such anti-rotation condition, the two sawtooth-like projections 48 on the inner surface 44 of the flange portion 28 of the adjuster nut 10 will be automatically engaged with corresponding ones of the plurality of grooves 54 formed on the exterior surface 52 of the vehicle frame 42 as the adjuster nut 10 is pushed against the vehicle frame.

Inward or outward movement of the rotatable stem 18 will cause the entire headlamp sub-assembly to pivotally move about a horizontal axis passing through the ball element 62 of the center pivot element 64 (into and out of the drawing) so as to adjust vertically the headlamp for automotive headlamp aiming purposes. It will be apparent to those skilled in the art that another similar snap-in adjuster nut is required if it is desired to adjust the headlamp about a vertical axis.

From the foregoing detailed description, it can thus be seen that the present invention provides an improved snap-in headlamp adjustment assembly for positioning a vehicle headlamp. The adjustment assembly includes a snap-in adjuster nut which is comprised of a head portion, a body portion, and a flange portion. The head portion includes a plurality of resilient arms which are interlockingly engagable with an interior retaining surface of the vehicle frame to secure the adjuster nut against axial movement relative to an opening in the vehicle frame. A pair of projections are formed on the flange portion and are engagable with corresponding grooves disposed adjacent the opening on an exterior surface of the vehicle frame to secure the adjuster nut against rotation relative to the opening on the vehicle frame.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A snap-in headlamp adjustment assembly for positioning a vehicle headlamp mounted upon a movable mounting bracket relative to a fixed vehicle frame, said adjustment assembly comprising, in combination:

a snap-in adjuster nut being formed of a head portion, a body portion and a flange portion;

said body portion having its one end formed integrally with said head portion and its other end joined integrally to said flange portion;

said head portion having a collar and a plurality of resilient arms extending longitudinally from said collar in a direction towards said body portion, each of said plurality of resilient arms having an end surface;

said flange portion having a pair of projections disposed on its inner surface adjacent said body portion;

said adjuster nut having an adjustment screw extending longitudinally therethrough, one end of said adjustment screw being adapted for engagement with said movable mounting bracket;

said head portion of said adjuster nut being inserted through an opening formed in the fixed vehicle frames so that the end surfaces of said plurality of resilient arms interlockingly engage with an interior retaining surface of the fixed vehicle frame to secure said adjuster nut against axial movement relative to the opening in the vehicle frame; and said pair of projections on said flange portion being engagable with groove means disposed adjacent the opening on an exterior surface of the vehicle frame to secure said adjuster nut against rotation relative to the opening in the vehicle frame.

2. A snap-in headlamp adjustment assembly as claimed in claim 1, wherein said plurality of resilient arms are comprised of two resilient arms which are diametrically opposed to each other.

3. A snap-in headlamp adjustment assembly as claimed in claim 1, wherein said plurality of resilient arms are comprised of four resilient arms which are equally spaced from each other.

4. A snap-in headlamp adjustment assembly as claimed in claim 1, wherein said end surfaces of said plurality of resilient arms are inwardly sloped so as to provide a wedging action with the opening formed in the vehicle frame when said adjuster nut is inserted into the vehicle frame.

5. A snap-in headlamp adjustment assembly as claimed in claim 1, wherein said adjuster nut is formed of a plastic material.

6. A snap-in headlamp adjustment assembly as claimed in claim 5, wherein said adjustment nut is formed of nylon.

7. A snap-in headlamp adjustment assembly as claimed in claim 1, wherein said pair of projections are disposed in a diametrically opposed relationship.

8. A snap-in headlamp adjustment assembly as claimed in claim 7, wherein said pair of projections are substantially aligned longitudinally with the end surfaces of said corresponding ones of the plurality of resilient arms.

9. A snap-in headlamp adjustment assembly as claimed in claim 1, wherein said groove means is comprised of a plurality of equally-spaced grooves which are disposed circumferentially on the exterior surface of the vehicle frame.

10. A snap-in headlamp adjustment assembly for positioning a vehicle headlamp mounted upon a movable mounting bracket relative to a fixed vehicle frame, said adjustment assembly comprising, in combination:

a snap-in adjuster nut being formed of a head portion, a body portion and a flange portion;

said body portion having its one end formed integrally with said head portion and its other end joined integrally to said flange portion;

said head portion having a collar and at least two resilient arms extending longitudinally from said collar in a direction towards said body portion, each of said resilient arms having an end surface;

said flange portion having at least one projection disposed on its inner surface adjacent said body portion;

said adjuster nut having an adjustment screw extending longitudinally therethrough, one end of said adjustment screw being adapted for engagement with said movable mounting bracket;

said head portion of said adjuster nut being inserted through an opening formed in the fixed vehicle frames so that the end surfaces of said resilient arms interlockingly engage with an interior retaining surface of the fixed vehicle frame to secure said adjuster nut against axial movement relative to the opening in the vehicle frame; and said at least one projection on said flange portion being engagable with a corresponding groove disposed adjacent the opening on an exterior surface of the vehicle frame to secure said adjuster nut against rotation relative to opening in the vehicle frame.

11. A snap-in headlamp adjustment assembly as claimed in claim 10, wherein said end surfaces of said resilient arms are inwardly sloped so as to provide a wedging action with the opening formed in the vehicle frame when said adjuster nut is inserted into the vehicle frame.

12. A snap-in headlamp adjustment assembly as claimed in claim 10, wherein said adjuster nut is formed of a plastic material.

13. A snap-in headlamp adjustment assembly as claimed in claim 12, wherein said adjustment nut is formed of nylon.

* * * * *